July 29, 1924.
J. B. REPLOGLE
ELECTRIC THROTTLE GOVERNOR
Filed Nov. 11, 1918
1,502,800
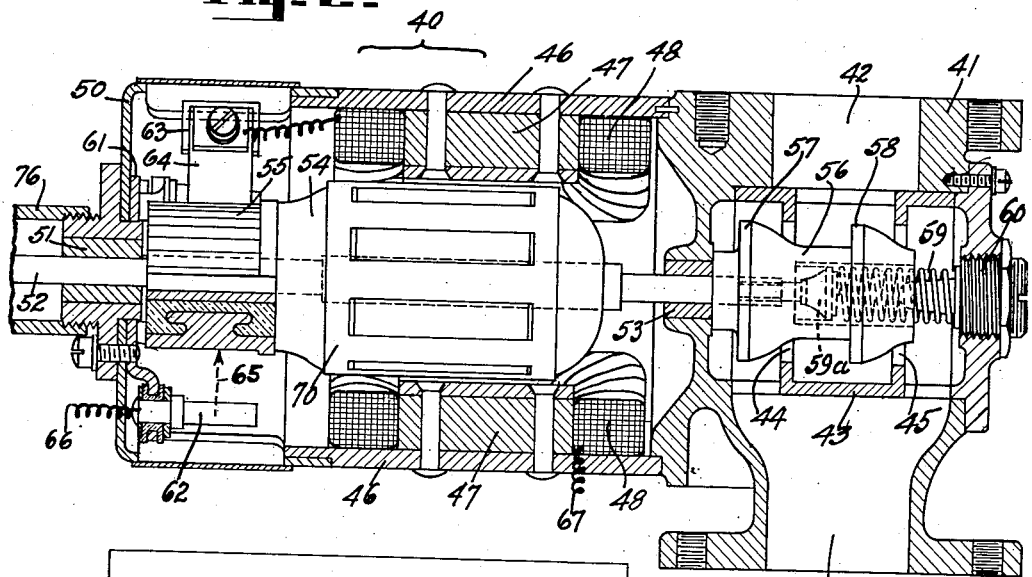
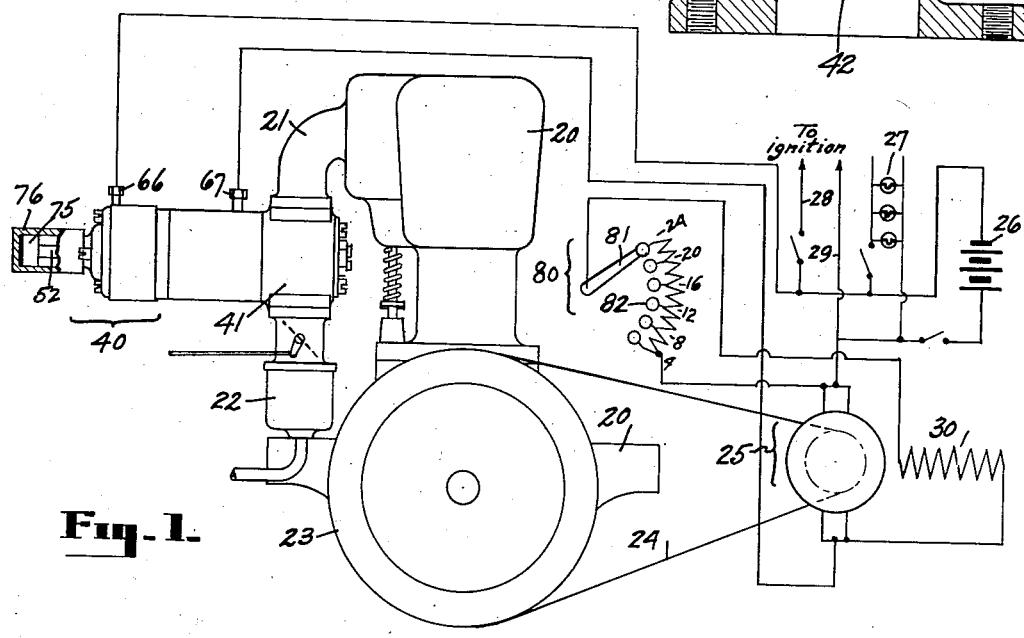

Patented July 29, 1924.

1,502,800

UNITED STATES PATENT OFFICE.

JAMES B. REPLOGLE, OF DETROIT, MICHIGAN, ASSIGNOR TO THE REMY ELECTRIC COMPANY, A CORPORATION OF INDIANA.

ELECTRIC THROTTLE GOVERNOR.

Application filed November 11, 1918. Serial No. 262,010.

*To all whom it may concern:*

Be it known that I, JAMES B. REPLOGLE, a citizen of the United States of America, residing at Detroit, county of Wayne, and State of Michigan, have invented certain new and useful Improvements in Electric Throttle Governors, of which the following is a full, clear, and exact description.

This invention relates to automatically controlled valves, and has among its objects the provision of a valve which is particularly adapted for prime movers, such as steam or internal combustion engines; and wherein the admission of the power fluid, such as steam or combustible mixture, to the prime mover may be controlled automatically and in accordance with the operation thereof, in order that the prime mover may be throttled when the speed exceeds a predetermined value.

It is an aim of the invention to provide an automatic valve which will be quickly responsive to very slight variations in the operation of the prime mover, whereby the speed may be regulated to a very fine degree.

One manner of carrying out these objects consists in providing a valve which is controlled electrically by means of current delivered thereto by a generator driven by the prime mover. In this connection it is an object of the invention to provide means for varying the current delivered to the valve controlling devices in order to vary the governed speed of the prime mover.

Other and further objects and advantages of the present invention will be apparent from the following description, reference being had to the accompanying drawings, wherein preferred embodiments of the present invention are clearly shown.

In the drawings:

Fig. 1 is an end view of an internal combustion engine to which the present invention is applied, and Fig. 1 includes a wiring diagram of an electrical system associated with the present invention; and Fig. 2 is a longitudinal sectional view of the automatic throttle valve.

Referring to the drawings:

20 designates an internal combustion engine having an intake 21 and a carburetor 22. The fly wheel 23 of the engine is connected by means of a belt 24 with a generator 25. The generator 25 may be used for charging a storage battery 26 and for supplying current to lamps or other electric translation devices 27. Where the prime mover is an internal combustion engine ignition current may be taken from the battery or the generator by means of the wires 28 and 29 which are connected with suitable ignition devices, which are not shown. Where the prime mover 20 is a steam engine, of course, the ignition apparatus will not be required.

Between the intake 21 and the carburetor 22 is connected the valve port casing or port member 41 of the automatic throttle valve 40. The casing 41 is provided with a passage 42 leading from the carburetor 22 to the engine intake 21. A sleeve 43, provided with valve ports 44 and 45 is mounted within the casing 41.

The casing 41 supports a motor field shell 46 which is provided with pole pieces 47 and field series windings 48. The shell 46 supports an end frame 50 which carries a shaft bearing 51. A shaft 52 is journalled in the bearing 51 and in a bearing 53 supported by the casing 41. Said shaft 52 carries a motor armature 54, commutator 55 and a valve or port closing member 56.

Valve 56 is provided with flange 57 which co-operates with the port 44, and with the flange 58 co-operating with the port 45. The sides of flanges 57 and 58 are shaped in such a manner that the area of port opening will change in direct proportion to endwise movements of the shaft 52. A spring 59, located between the bearing 59$^a$ and a plug 60 supported by the casing 41, serves normally to maintain the armature 54 in non-symmetrical relation with the pole pieces 47.

The end frame 50 supports a brush holder bracket 61 upon which are mounted brush holder posts 62, for pivotally supporting brush holders 63, one of which is shown, the other being omitted for sake of clearness. Brushes 64 and 65 cooperate with the commutator 55. One of these brushes is shown and the other indicated by the arrow 65.

The armature core is made of solid steel instead of a series of superimposed punchings as in the usual construction. This construction is necessary for the reason that if the motor armature were of the usual construction referred to, the motor would run "wild" since it carries practically no load.

By using a solid steel armature core in a series wound motor, the eddy current losses will exceed the counter-electromotive-forces induced in the armature and thereby limit the speed of the motor. In order to further limit the rotative movement of the armature, a squirrel cage 70 of conducting material is mounted on the armature core.

The motor terminals 66 and 67 are connected in series with the armature winding of the generator 25 and a rheostat 80 comprising a contact arm 81 and a series of buttons 82 connected with suitable resistance units is connected in series with the shunt field winding 30 of the generator 25.

The operation of the automatic throttle valve is as follows:

Suppose, for example, that the engine 20 is used to propel a vehicle, and that it is desired to limit the speed of the vehicle to 24 miles per hour. The contact arm 81 will be placed on the button marked 24. When the engine is running, a portion of the current generated by the generator 25 will pass through the shunt field circuit, including the winding 30, the rheostat 80, and the remainder through the series motor windings of the automatic valve 40 and thence to battery 26. When the engine is driving the generator, the armature shaft 52 of the automatic valve 40 will be continuously rotating. When the speed of the engine reaches a predetermined amount, sufficient current will be delivered to the motor field windings, to cause the motor field to be energized sufficiently to attract the armature 54, and to tend to cause the said armature to move endwise and to assume symmetrical relation to the pole pieces 47. This endwise movement of the armature 52 will cause the valve 56 to close the ports 44 and 45 and thereby cut down the amount of combustible mixture delivered to the engine. When this occurs the speed of the engine will tend to fall off, thereby causing the amount of current delivered to the motor to decrease, whereupon the motor field windings 48 will be deenergized somewhat to allow the spring 59 to restore the armature 54 to its non-symmetrical position. However, a balance will be reached between the forces causing the endwise movement of the armature 54, in order that the valve 56 may be maintained in a position to regulate the quantity of fuel delivered to the engine so that the speed of the engine will be limited to the desired value.

By referring to Fig. 2, it will be noted that a balanced throttle valve is employed, in order that any sluggishness of operation resulting from unbalanced pressure on the valve will be eliminated. Since the armature shaft 52 is continuously rotating, friction will be taken up by the transverse movement of the periphery of said shaft, permitting the shaft to move endwise in as free a manner as though friction were not existing.

Besides eliminating the retarding effects of mechanical friction, the rotation of the armature nullifies the lagging of the endwise movements of the armature shaft behind the changes in E. M. F. impressed upon the motor, which is due to hysteretic effects.

Hence it follows that there is practically no time interval between the changes in E. M. F. impressed upon the motor and the movements of the valve corresponding to such changes. In the manner referred to, mechanical friction and magnetic forces tending to hinder the quick response of the valve to changes in the electro-motive-force impressed upon the motor have been practically eliminated. The result is that the automatic throttle valve will be almost instantly responsive to very slight increases in the speed of the engine above a certain amount.

If it is desired to reduce the maximum speed limit of the engine, to 16 miles an hour for example, the rheostat arm 81 is moved to the button 82 which is marked 16. By cutting down the resistance in the generator field circuit a greater amount of current for a given speed will be delivered to the motor of the automatic throttle valve 40, and consequently the valve 56 will commence to close at a lower engine speed. In this manner the speed of the engine can be varied to suit the desires of the operator.

By turning the plug 60 the tension in the spring 59 can be adjusted so as to vary the amount of current required to be delivered to the throttle governor before the tension in spring 59 will be overcome. In this manner the battery charging rate will be varied.

Where the motor throttle governor is used with certain types of prime movers such as internal combustion engines, in which there is an appreciable time interval between the admission of the power fluid and the transformation into mechanical energy, there is a tendency for the prime mover to lag behind the throttle governor. In order to prevent "hunting," the armature shaft 52 is provided with a dash pot piston 75 which cooperates with a dash pot 76 suitably mounted on the end frame 50.

While the automatic valve 40 is shown in connection with an internal combustion engine it will be understood that it can be applied as well to steam engines, steam and water turbines, air engines and the like.

While the form of mechanism herein shown and described constitutes a preferred form of embodiment of the invention, it is to be understood that other forms might be adopted, all coming within the scope of the claims which follow.

1. In a valve controlling mechanism, the combination with a port member; of a rotatable and axially movable shaft; a valve supported by said shaft; and means for moving the shaft endwise to place the valve in various throttling positions and for continuously rotating the shaft, the degree of throttling of said port being unaffected by valve rotation.

2. In a valve controlling mechanism, the combination with a port member and valve; a movable valve carrying element; a support providing a bearing for said element; and means for moving said element in a certain direction relative to the bearing to move the valve into various throttling positions, and for continuously moving said valve relative to said bearing in a direction transverse to the direction of the first mentioned movement independent of the throttling movement of said valve, the degree of throttling of said port being unaffected by the second mentioned movement.

3. In a valve controlling mechanism, the combination with a fixed member having a port; of a valve rotatably supported by said fixed member; and electromagnetic valve controlling means including instrumentalities for rotating the valve continuously.

4. In a valve controlling mechanism, the combination with a fixed member having a port; of a valve supported for rotary and axial movement; and electromagnetic valve controlling means including instrumentalities for axially moving the valve into different throttling positions, and for rotating the valve independent of the axial movement thereof.

5. In a valve controlling mechanism, the combination with a fixed member having a port; of a valve supported for rotary and axial movement; and electromagnetic valve controlling means including instrumentalities for axially moving the valve into different throttling positions and for rotating the valve simultaneously with axial movement thereof or independent of said axial movement.

6. In a valve controlling mechanism, the combination with a port member and a valve, of an electric motor including a stationary magnetic field and a rotating armature normally in unsymmetrical longitudinal relation with the field, said armature being arranged to rotate the valve and being responsive to changes in impressed E. M. F. to assume a symmetrical relation with the field in order to move the valve longitudinally.

7. In a valve controlling mechanism, the combination with a valve seat and a valve; of means for moving said valve bodily into various throttling positions and for rotating said valve independent of said bodily movement thereof, said means having provisions for preventing excessive rotary movement of the valve, the degree of valve opening being unaffected by said valve rotation.

8. In a valve controlling mechanism, the combination with a valve seat; of a valve mounted for rotation; an electric motor for continuously rotating the valve while causing said valve to be moved longitudinally, said motor having provisions to prevent excessive rotation of the armature and of the valve operated thereby.

9. In a valve controlling mechanism, the combination with a valve seat; of a rotatably mounted valve; and a series wound motor for rotating the valve while causing said valve to be moved longitudinally, said motor having a solid steel armature core in order to limit the speed of the armature and the valve.

10. In a valve controlling mechanism, the combination with a valve seat; of a rotatably mounted valve; and a series wound motor for rotating the valve while causing said valve to be moved longitudinally, said motor having an armature upon which is mounted a squirrel cage of conducting material.

11. In a valve controlling mechanism, the combination with a valve seat member including inlet and outlet passages and a seat for a valve; of a motor field frame including field windings secured to the valve seat member; a motor end frame secured to the field frame; an armature shaft journalled in the end frame and valve seat member; a motor armature mounted on said shaft; a valve mounted on the shaft; and means tending to keep the armature in nonsymmetrical longitudinal relation with the field.

12. In a valve controlling mechanism, the combination with a fixed member having a port; of a valve rotatably supported by said fixed member; electromagnetic valve controlling means for moving the valve bodily into throttling positions and for continuously rotating said valve independent of said bodily movement; and a spring yieldingly maintaining said valve in open position.

13. In a valve controlling mechanism, the combination with a fixed member having a port; of a shaft supported by said fixed member; a valve supported by said shaft; electromagnetic means for rotating said shaft and for moving said shaft axially into throttling positions; and a spring yieldingly maintaining said valve in open position.

14. In a valve controlling mechanism, the combination with a fixed member having a port; of a shaft supported by said fixed member; a valve supported by said shaft; electromagnetic means for rotating said shaft and for moving said shaft axially into throttling positions; a spring yieldingly maintaining said valve in open position; and means for adjusting said spring to vary the operation of said means.

15. In a valve controlling mechanism, the combination with an engine intake and a carburetor; of a frame providing passage from the carburetor to the engine intake and provided with ports; a throttle valve cooperating with the ports and rotatably supported by said frame; and apparatus mounted on the frame for moving the valve into open or closed positions and for continuously rotating the valve in its various throttling positions, the degree of valve opening being unaffected by said valve rotation.

16. In a valve controlling mechanism, the combination with an engine intake and a carburetor; of a valve frame providing passage from the carburetor to the engine intake; a sleeve mounted within the valve frame extending across said passage and provided with ports; a motor field frame secured to the valve frame; a motor end frame secured to the field frame; an armature shaft journalled in the end frame and valve frame; a motor armature mounted on said shaft; a valve mounted on the shaft and cooperating with said ports; and means tending to keep the armature in nonsymmetrical relation with the field.

In testimony whereof I affix my signature.

JAMES B. REPLOGLE.

Witnesses:
L. L. HOSIER,
MAX L. HILLMER.